United States Patent
Lee et al.

(10) Patent No.: US 9,328,803 B2
(45) Date of Patent: May 3, 2016

(54) PLANETARY GEAR TRAIN OF AUTOMATIC TRANSMISSION FOR VEHICLE

(71) Applicant: Hyundai Motor Company, Seoul (KR)

(72) Inventors: Chang Wook Lee, Whasung-Si (KR);
Kangsoo Seo, Whasung-Si (KR);
Myonghoon Noh, Whasung-Si (KR);
Jae Chang Kook, Whasung-Si (KR);
Hyukjun Lee, Whasung-Si (KR);
Jongsool Park, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 190 days.

(21) Appl. No.: 13/957,122

(22) Filed: Aug. 1, 2013

(65) Prior Publication Data

US 2014/0128202 A1 May 8, 2014

(30) Foreign Application Priority Data

Nov. 5, 2012 (KR) .................. 10-2012-0124117

(51) Int. Cl.
*F16H 3/44* (2006.01)
*F16H 3/66* (2006.01)

(52) U.S. Cl.
CPC .. *F16H 3/44* (2013.01); *F16H 3/66* (2013.01); *F16H 3/666* (2013.01); *F16H 2200/006* (2013.01); *F16H 2200/2007* (2013.01); *F16H 2200/2046* (2013.01)

(58) Field of Classification Search
CPC .................. F16H 3/44; F16H 3/666
See application file for complete search history.

(56) References Cited

U.S. PATENT DOCUMENTS

| | | | | |
|---|---|---|---|---|
| 4,615,240 A | * | 10/1986 | Weiss | 475/205 |
| 8,235,853 B2 | * | 8/2012 | Lutoslawski | 475/5 |
| 2007/0254766 A1 | * | 11/2007 | Hiraiwa | 475/269 |
| 2014/0128203 A1 | * | 5/2014 | Lee et al. | 475/284 |
| 2014/0128204 A1 | * | 5/2014 | Lee et al. | 475/288 |
| 2014/0162831 A1 | * | 6/2014 | Lee et al. | 475/284 |

FOREIGN PATENT DOCUMENTS

| | | | |
|---|---|---|---|
| JP | 5-172200 A | | 7/1993 |
| JP | 2005-23987 A | | 1/2005 |
| KR | 2012-0042567 | * | 5/2012 |
| KR | 2012-0042568 | * | 5/2012 |
| KR | 10-1172304 B1 | | 8/2012 |

* cited by examiner

*Primary Examiner* — Colby M Hansen
(74) *Attorney, Agent, or Firm* — Morgan, Lewis & Bockius LLP

(57) ABSTRACT

A planetary gear train of an automatic transmission may include: an input shaft; an output shaft parallel with the input shaft; a first planetary gear set on the input shaft including a first, second and third rotation elements, the first selectively connected to the input shaft, and the third selectively connected to the input shaft; a second planetary gear set on the output shaft including a fourth, fifth and sixth rotation elements, the first selectively connected to the input shaft through two gear ratio paths and selectively connected to a transmission housing, the fifth selectively connected to the input shaft and the transmission housing, and the sixth connected to the second rotation element and directly connected to the output shaft; four transfer gears; and frictional elements including clutches and brakes.

6 Claims, 13 Drawing Sheets

FIG. 2

|      | C1 | C2 | C3 | C4 | B1 | B2 | gear ratio |
|------|----|----|----|----|----|----|------------|
| 1ST  | ●  |    |    |    | ●  |    | 4.458      |
| 2ND  | ●  |    |    |    |    | ●  | 2.706      |
| 3RD  | ●  | ●  |    |    |    |    | 1.865      |
| 4TH  | ●  |    | ●  |    |    |    | 1.328      |
| 5TH  | ●  |    |    | ●  |    |    | 1.047      |
| 6TH  |    |    | ●  | ●  |    |    | 0.789      |
| 7TH  |    | ●  |    | ●  |    |    | 0.624      |
| 8TH  |    |    |    | ●  |    | ●  | 0.538      |
| REV  |    |    | ●  |    | ●  |    | 3.886      |

PLANETARY GEAR TRAIN OF AUTOMATIC TRANSMISSION FOR VEHICLE

CROSS-REFERENCE TO RELATED APPLICATION

The present application claims priority of Korean Patent Application Number 10-2012-0124117 filed Nov. 5, 2012, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability and power delivery performance and reduce fuel consumption.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing the number of components as a consequence of achieving eight forward speeds and one reverse speed by disposing two planetary gear sets separately on an input shaft and an output shaft disposed in parallel and connecting rotation elements of the planetary gear sets through a plurality of externally-meshed gears.

In addition, the present invention has been made in an effort to provide a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

A planetary gear train of an automatic transmission for a vehicle according to one aspect of the present invention may include: an input shaft receiving torque of an engine; an output shaft disposed in parallel with the input shaft with a predetermined distance and outputting changed torque; a first planetary gear set disposed on the input shaft, and including a first rotation element selectively connected to the input shaft, a second rotation element operated as an output element, and a third rotation element selectively connected to the input shaft; a second planetary gear set disposed on the output shaft, and including a fourth rotation element selectively connected to the input shaft through two paths having different gear ratios and selectively connected to a transmission housing, a fifth rotation element selectively connected to the input shaft and the transmission housing, and a sixth rotation element connected to the second rotation element and directly connected to the output shaft; four transfer gears externally meshing the fourth, fifth, and sixth rotation elements with the input shaft, the second rotation element or the third rotation element; and frictional elements including clutches selectively connecting the first, third, and fourth rotation elements with the input shaft and brakes selectively connecting the fourth and fifth rotation elements with the transmission housing.

The first planetary gear set may be a single pinion planetary gear set having a first sun gear being the first rotation element, a first planet carrier being the second rotation element, and a first ring gear being the third rotation element, and the second planetary gear set may be a single pinion planetary gear set having a second sun gear being the fourth rotation element, a second planet carrier being the fifth rotation element, and a second ring gear being the sixth rotation element.

The four transfer gears may include: a first transfer gear including a first transfer drive gear connected to the second rotation element and a first transfer driven gear connected to the sixth rotation element; a second transfer gear including a second transfer drive gear connected to the third rotation element and a second transfer driven gear connected to the fifth rotation element; a third transfer gear including a third transfer drive gear connected to the input shaft and a third transfer driven gear connected to the fourth rotation element; and a fourth transfer gear including a fourth transfer drive gear connected to the input shaft and a fourth transfer driven gear connected to the fourth rotation element.

The frictional elements may include: a first clutch disposed between the input shaft and the first rotation element; a second clutch disposed between the input shaft and the third transfer gear; a third clutch disposed between the fourth transfer gear and the fourth rotation element; a fourth clutch disposed between the input shaft and the third rotation element; a first brake disposed between the fifth rotation element and the transmission housing; and a second brake disposed between the fourth rotation element and the transmission housing.

The first clutch and the first brake may be operated at a first forward speed, the first clutch and the second brake may be operated at a second forward speed, the first clutch and the second clutch may be operated at a third forward speed, the first clutch and the third clutch may be operated at a fourth forward speed, the first clutch and the fourth clutch may be operated at a fifth forward speed, the third clutch and the fourth clutch may be operated at a sixth forward speed, the second clutch and the fourth clutch may be operated at a seventh forward speed, the fourth clutch and the second brake may be operated at an eighth forward speed, and the third clutch and the first brake may be operated at a reverse speed.

The frictional elements may include: a first clutch disposed between the input shaft and the first rotation element; a second clutch disposed between the third transfer gear and the fourth rotation element; a third clutch disposed between the fourth transfer gear and the fourth rotation element; a fourth clutch disposed between the input shaft and the third rotation element; a first brake disposed between the fifth rotation element and the transmission housing; and a second brake disposed between the fourth rotation element and the transmission housing.

The frictional elements may include: a first clutch disposed between the input shaft and the first rotation element; a second clutch disposed between the input shaft and the third transfer gear; a third clutch disposed between the fourth transfer gear and the fourth rotation element; a fourth clutch disposed between the input shaft and the third rotation element; a first brake disposed between the third rotation element and the transmission housing; and a second brake disposed between the fourth rotation element and the transmission housing.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

A planetary gear train of an automatic transmission for a vehicle according to another aspect of the present invention may include: an input shaft receiving torque of an engine; an output shaft disposed in parallel with the input shaft with a predetermined distance and outputting changed torque; a first planetary gear set disposed on the input shaft, and including a first rotation element selectively connected to the input shaft, a second rotation element, and a third rotation element selectively connected to the input shaft; a second planetary gear set disposed on the output shaft, and including a fourth rotation element selectively connected to the input shaft through two paths having different gear ratios and selectively connected to a transmission housing, a fifth rotation element selectively connected to the input shaft and the transmission housing, and a sixth rotation element connected to the second rotation element and directly connected to the output shaft; a first transfer gear connecting the second rotation element with the sixth rotation element; a second transfer gear connecting the third rotation element with the fifth rotation element; a third transfer gear connecting the input shaft with the fourth rotation element; a fourth transfer gear connecting the input shaft with the fourth rotation element; and frictional elements including clutches selectively connecting the first, third, and fourth rotation elements with the input shaft and brakes selectively connecting the fourth and fifth rotation elements with the transmission housing.

The first planetary gear set may be a single pinion planetary gear set having a first sun gear being the first rotation element, a first planet carrier being the second rotation element, and a first ring gear being the third rotation element, and the second planetary gear set may be a single pinion planetary gear set having a second sun gear being the fourth rotation element, a second planet carrier being the fifth rotation element, and a second ring gear being the sixth rotation element.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The frictional elements may include: a first clutch disposed between the input shaft and the first rotation element; a second clutch disposed between the input shaft and the third transfer gear; a third clutch disposed between the fourth transfer gear and the fourth rotation element; a fourth clutch disposed between the input shaft and the third rotation element; a first brake disposed between the fifth rotation element and the transmission housing; and a second brake disposed between the fourth rotation element and the transmission housing.

The frictional elements may include: a first clutch disposed between the input shaft and the first rotation element; a second clutch disposed between the third transfer gear and the fourth rotation element; a third clutch disposed between the fourth transfer gear and the fourth rotation element; a fourth clutch disposed between the input shaft and the third rotation element; a first brake disposed between the fifth rotation element and the transmission housing; and a second brake disposed between the fourth rotation element and the transmission housing.

The frictional elements may include: a first clutch disposed between the input shaft and the first rotation element; a second clutch disposed between the input shaft and the third transfer gear; a third clutch disposed between the fourth transfer gear and the fourth rotation element; a fourth clutch disposed between the input shaft and the third rotation element; a first brake disposed between the third rotation element and the transmission housing; and a second brake disposed between the fourth rotation element and the transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to the planetary gear train of FIG. 1.

DETAILED DESCRIPTION

Figure 1:
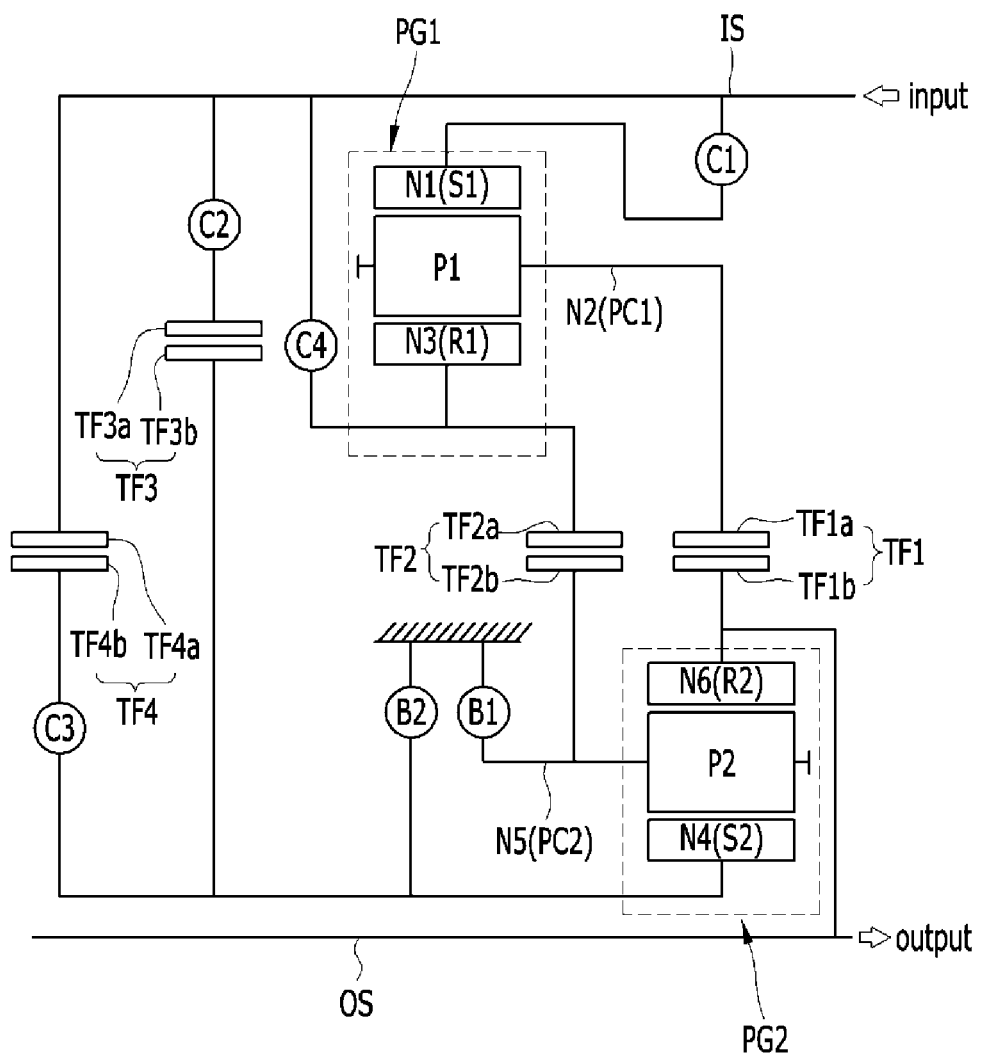
FIG. 1 is a schematic diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining various aspects of the present invention will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to various embodiments of the present invention.

Referring to FIG. 1, a planetary gear train according to various embodiments of the present invention includes a first planetary gear set PG1 disposed on an input shaft IS, a second planetary gear set PG2 disposed on an output shaft OS disposed in parallel with the input shaft IS, and frictional elements consisting of four clutches C1, C2, C3, and C4 and two brakes B1 and B2.

Therefore, torque input from the input shaft IS is converted into eight forward speeds and one reverse speed by cooperation of the first and second planetary gear sets PG1 and PG2, and then is output through the output shaft OS.

The input shaft IS is an input member, and torque from a crankshaft of the engine is changed through a torque converter and is then input to the input shaft IS.

The output shaft OS is an output member and transmits driving torque to a driving wheel through a differential apparatus.

The first planetary gear set PG1 is a single pinion planetary gear set, and includes a first sun gear S1 being a first rotation element N1, a first planet carrier PC1 rotatably supporting a first pinion P1 externally meshed with the first sun gear S1 and being a second rotation element N2, and a first ring gear R1 internally meshed with the first pinion P1 and being a third rotation element N3.

The second planetary gear set PG2 is a single pinion planetary gear set, and includes a second sun gear S2 being a fourth rotation element N4, a second planet carrier PC2 rotatably supporting a second pinion P2 externally meshed with the second sun gear S2 and being a fifth rotation element N5, and a second ring gear R2 internally meshed with the second pinion P2 and being a sixth rotation element N6.

Two rotation elements of the first planetary gear set PG1 is selectively connected to the input shaft IS, three rotation elements of the second planetary gear set PG2 is connected to the input shaft IS and two rotation elements of the first planetary gear set PG1 through first, second, third, and fourth transfer gears TF1, TF2, TF3, and TF4, and any one rotation element of the second planetary gear set PG2 is directly connected to the output shaft OS.

The first, second, third, and fourth transfer gears TF1, TF2, TF3, and TF4 respectively have first, second, third, and fourth transfer drive gears TF1a, TF2a, TF3a, and TF4a and first, second, third, and fourth transfer driven gears TF1b, TF2b, TF3b, and TF4b externally meshed with each other.

The first transfer gear TF1 connects the second rotation element N2 with the sixth rotation element N6.

The second transfer gear TF2 connects the third rotation element N3 with the fifth rotation element N5.

The third transfer gear TF3 connects the input shaft IS with the fourth rotation element N4.

The fourth transfer gear TF4 connects the input shaft IS with the fourth rotation element N4.

Therefore, the rotation elements (including the first shaft IS1) connected with each other through the first, second, third, and fourth transfer gears TF1, TF2, TF3, and TF4 are rotated in opposite direction to each other according to gear ratios of the first, second, third, and fourth transfer gears TF1, TF2, TF3, and TF4.

In addition, four clutches C1, C2, C3, and C4 and two brakes B1 and B2 selectively connecting the selected rotation elements with the input shaft IS and the transmission housing H are disposed as follows.

The first clutch C1 is disposed between the input shaft IS and the first rotation element N1.

The second clutch C2 is disposed between the input shaft IS and the third transfer gear TF3.

The third clutch C3 is disposed between the fourth rotation element N4 and the fourth transfer gear TF4.

The fourth clutch C4 is disposed between the input shaft IS and the third rotation element N3.

The first brake B1 is disposed between the fifth rotation element N5 and the transmission housing H.

The second brake B2 is disposed between the fourth rotation element N4 and the transmission housing H.

Both of the second clutch C2 and the third clutch C3 selectively connect the input shaft IS with the fourth rotation element N4, but rotation speeds transmitted to the fourth rotation element N4 through the second clutch C2 and the third clutch C3 are different from each other since the gear ratio of the third transfer gear TF3 differs from the gear ratio of the fourth transfer gear TF4.

The frictional elements consisting of the first, second, third, and fourth clutches C1, C2, C3, and C4 and the first and second brakes B1 and B2 are conventional multi-plate friction elements of wet type that are operated by hydraulic pressure.

FIG. 2 is an operational chart of friction elements at each shift-speed applied to a planetary gear train according to various embodiments of the present invention.

As shown in FIG. 2, two frictional elements are operated at each shift-speed in the planetary gear train according to various embodiments of the present invention.

The first clutch C1 and the first brake B1 are operated at a first forward speed 1ST.

The first clutch C1 and the second brake B2 are operated at a second forward speed 2ND.

The first clutch C1 and the second clutch C2 are operated at a third forward speed 3RD.

The first clutch C1 and the third clutch C3 are operated at a fourth forward speed 4TH.

The first clutch C1 and the fourth clutch C4 are operated at a fifth forward speed 5TH.

The third clutch C3 and the fourth clutch C4 are operated at a sixth forward speed 6TH.

The second clutch C2 and the fourth clutch C4 are operated at a seventh forward speed 7TH.

The fourth clutch C4 and the second brake B2 are operated at an eighth forward speed 8TH.

The third clutch C3 and the first brake B1 are operated at a reverse speed REV.

FIG. 3A to FIG. 3H are lever diagrams of a planetary gear train according to various embodiments of the present invention, and illustrate shift processes of the planetary gear train according to various embodiments of the present invention by lever analysis method.

Referring to FIG. 3A to FIG. 3H, three vertical lines of the second planetary gear set PG2 are set as the fourth, fifth, and sixth rotation elements N4, N5, and N6, and three vertical lines of the first planetary gear set PG1 are set as the third, the second, the first rotation elements N3, N2, and N1 from the left to the right.

A middle horizontal line represents a rotation speed of "0", upper horizontal lines represent positive rotation speeds and lower horizontal lines represent negative rotation speeds.

"−" means that rotational elements are rotated in an opposite direction to the rotation direction of the engine. It is because the input shaft IS and the rotation elements of the first planetary gear set PG1 are externally meshed through the first, second, third, and fourth transfer gears TF1, TF2, TF3, and TF4 without an idling gear.

In addition, distances between the vertical lines of the first and second planetary gear sets PG1 and PG2 are set according to gear ratios (teeth number of a sun gear/teeth number of a ring gear).

Hereinafter, referring to FIG. 2 and FIG. 3A to FIG. 3H, the shift processes of the planetary gear train according to various embodiments of the present invention will be described in detail.

First Forward Speed

Referring to FIG. 2, the first clutch C1 and the first brake B1 are operated at the first forward speed 1ST.

Figure 3A:
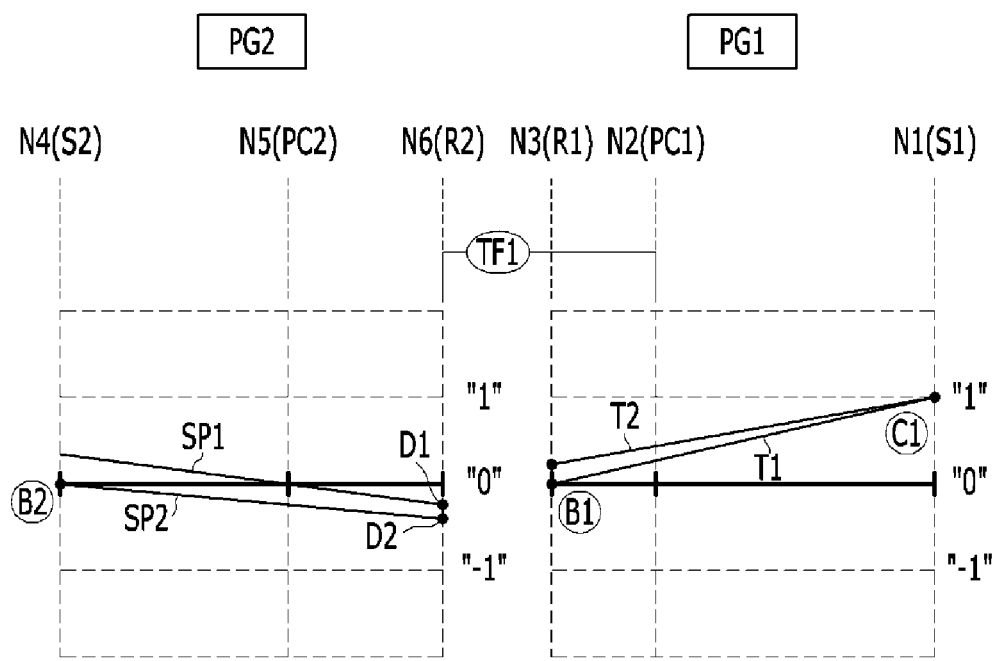
FIG. 3A is a lever diagram of the planetary gear train of FIG. 1 at the first forward speed and the second forward speed.

As shown in FIG. 3A, a rotation speed of the input shaft IS is input to the first rotation element N1 by operation of the first clutch C1 and the third rotation element N3 is operated as a fixed element by operation of the first brake B1. Therefore, the rotation elements of the first planetary gear set PG1 form a first speed line T1.

In addition, the fifth rotation element N5 is operated as a fixed element by operation of the first brake B1 and a rotation speed of the second rotation element N2 is changed according to the gear ratio of the first transfer gear TF1 and is then input to the sixth rotation element N6 as inverse rotation speed. Therefore, the rotation elements of the second planetary gear set PG2 form a first shift line SP1 and D1 is output through the sixth rotation element N6 that is the output element.

Second Forward Speed

The first brake B1 that was operated at the first forward speed 1ST is released and the second brake B2 is operated at the second forward speed 2ND.

As shown in FIG. 3A, the rotation speed of the input shaft IS is input to the first rotation element N1 by operation of the first clutch C1 and the fourth rotation element N4 is operated as a fixed element by operation of the second brake B2.

Therefore, the rotation elements of the first planetary gear set PG1 form a second speed line T2 and the rotation elements of the second planetary gear set PG2 form a second shift line SP2 by cooperation of the first planetary gear set PG1 and the second planetary gear set PG2. Therefore, D2 is output through the sixth rotation element N6 that is the output element.

Third Forward Speed

The second brake B2 that was operated at the second forward speed 2ND is released and the second clutch C2 is operated at the third forward speed 3RD.

Figure 3B:
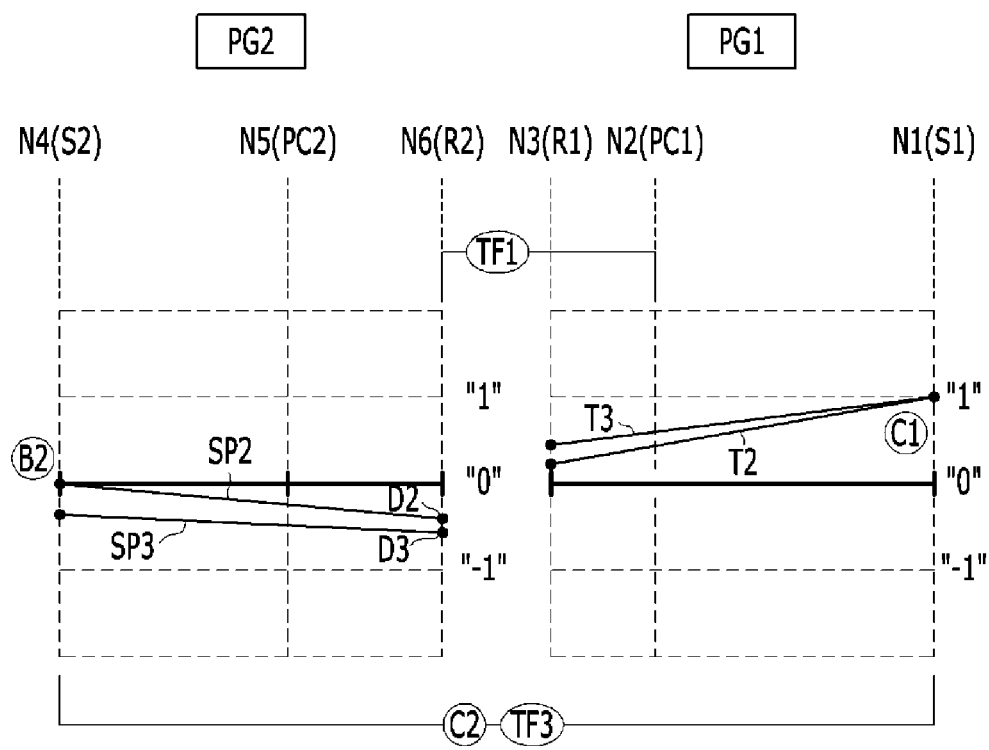
FIG. 3B is a lever diagram of the planetary gear train of FIG. 1 at the third forward speed.

As shown in FIG. 3B, the rotation speed of the input shaft IS is input to the first rotation element N1 by operation of the first clutch C1. In addition, the rotation speed of the input shaft IS is converted according to the gear ratio of the third transfer gear TF3 and is then input to the fourth rotation element N4 by operation of the second clutch C2.

Therefore, the rotation elements of the first planetary gear set PG1 form a third speed line T3 and the rotation elements of the second planetary gear set PG2 form a third shift line SP3 by cooperation of the first planetary gear set PG1 and the second planetary gear set PG2. Therefore, D3 is output through the sixth rotation element N6 that is the output element.

Fourth Forward Speed

The second clutch C2 that was operated at the third forward speed 3RD is released and the third clutch C3 is operated at the fourth forward speed 4TH.

Figure 3C:
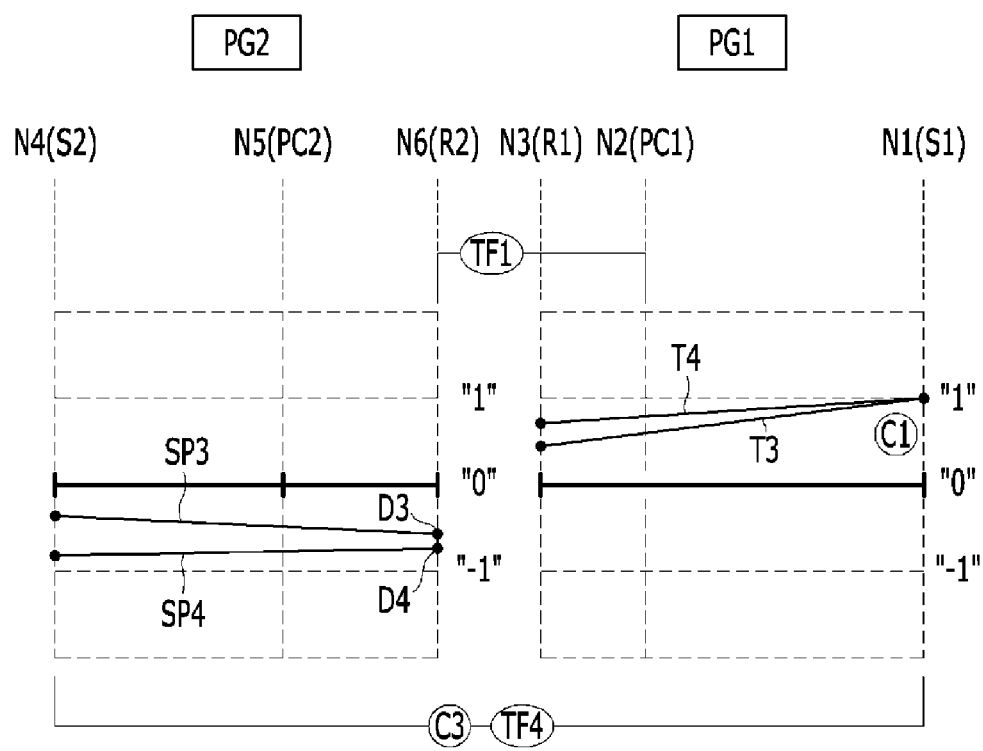
FIG. 3C is a lever diagram of the planetary gear train of FIG. 1 at the fourth forward speed.

As shown in FIG. 3C, the rotation speed of the input shaft IS is input to the first rotation element N1 by operation of the first clutch C1. In addition, the rotation speed of the input shaft IS is converted according to the gear ratio of the fourth transfer gear TF4 and is then input to the fourth rotation element N4 by operation of the third clutch C3.

Therefore, the rotation elements of the first planetary gear set PG1 form a fourth speed line T4 and the rotation elements of the second planetary gear set PG2 form a fourth shift line SP4 by cooperation of the first planetary gear set PG1 and the second planetary gear set PG2. Therefore, D4 is output through the sixth rotation element N6 that is the output element.

Fifth Forward Speed

The third clutch C3 that was operated at the fourth forward speed 4TH is released and the fourth clutch C4 is operated at the fifth forward speed 5TH.

Figure 3D:
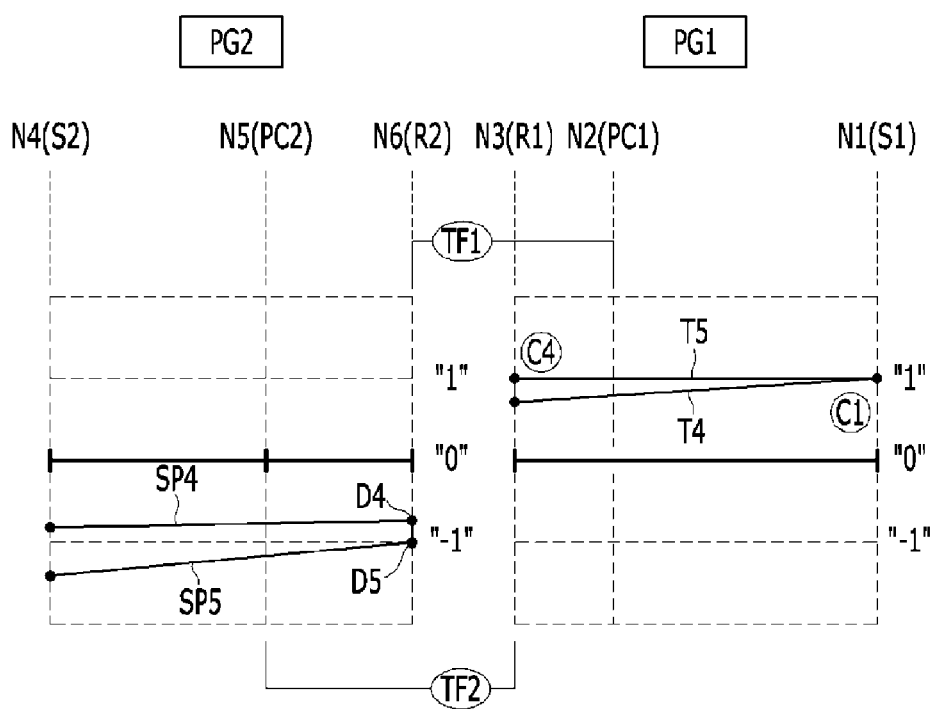
FIG. 3D is a lever diagram of the planetary gear train of FIG. 1 at the fifth forward speed.

As shown in FIG. 3D, the rotation speed of the input shaft IS is input to the first rotation element N1 and the third rotation element N3 by operation of the first clutch C1 and the fourth clutch C4. Therefore, the first planetary gear set PG1 becomes a direct-coupling state.

In addition, the rotation speed of the third rotation element N3 is converted according to the gear ratio of the second transfer gear TF2 and is then input to the fifth rotation element N5 as an inverse rotation speed.

Therefore, the rotation elements of the first planetary gear set PG1 form a fifth speed line T5 and the rotation elements of the second planetary gear set PG2 form a fifth shift line SP5 by cooperation of the first planetary gear set PG1 and the second planetary gear set PG2. Therefore, D5 is output through the sixth rotation element N6 that is the output element.

Sixth Forward Speed

The first clutch C1 that was operated at the fifth forward speed 5TH is released and the third clutch C3 is operated at the sixth forward speed 6TH.

Figure 3E:
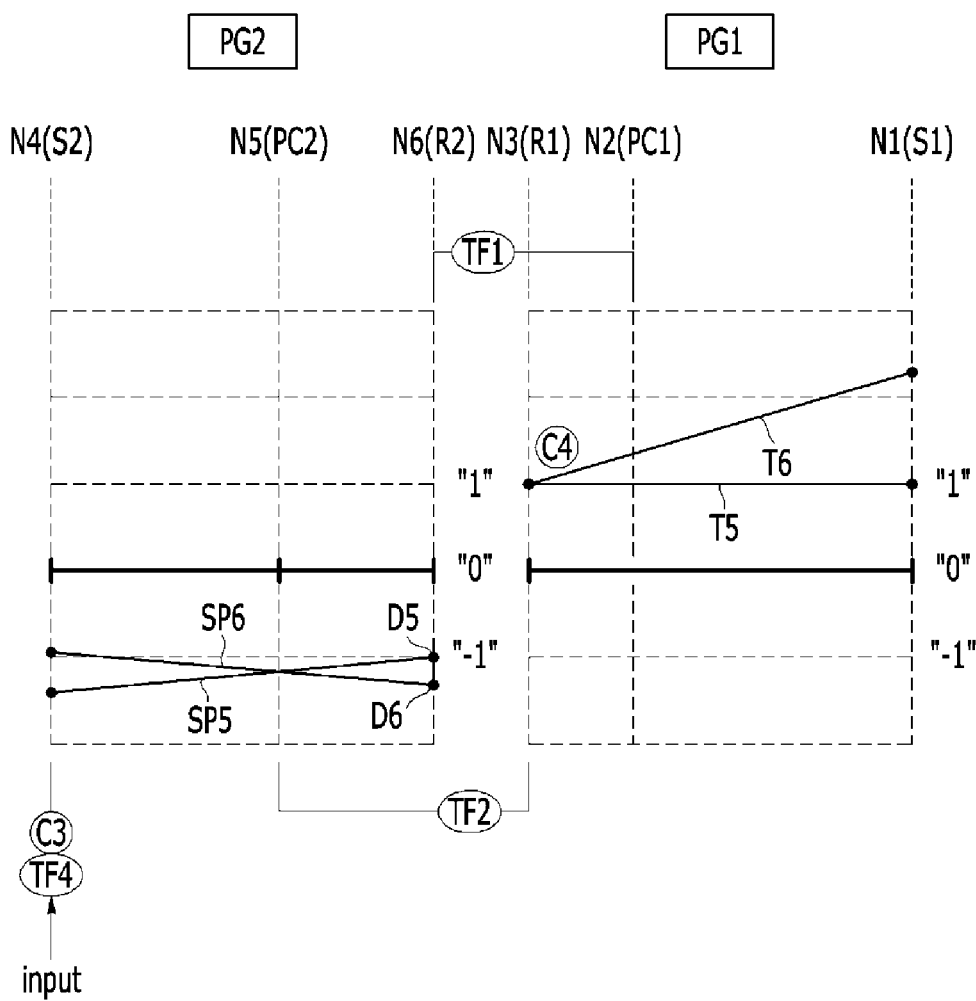
FIG. 3E is a lever diagram of the planetary gear train of FIG. 1 at the sixth forward speed.

As shown in FIG. 3E, the rotation element of the input shaft IS is input to the third rotation element N3 by operation of the fourth clutch C4. In addition, the rotation element of the input shaft IS is converted according to the gear ratio of the fourth transfer gear TF4 and is then input to the fourth rotation element N4 by operation of the third clutch C3.

Therefore, the rotation elements of the first planetary gear set PG1 form a sixth speed line T6 and the rotation elements of the second planetary gear set PG2 form a sixth shift line SP6 by cooperation of the first planetary gear set PG1 and the second planetary gear set PG2. Therefore, D6 is output through the sixth rotation element N6 that is the output element.

Seventh Forward Speed

The third clutch C3 that was operated at the sixth forward speed 6TH is released and the second clutch C2 is operated at the seventh forward speed 7TH.

Figure 3F:
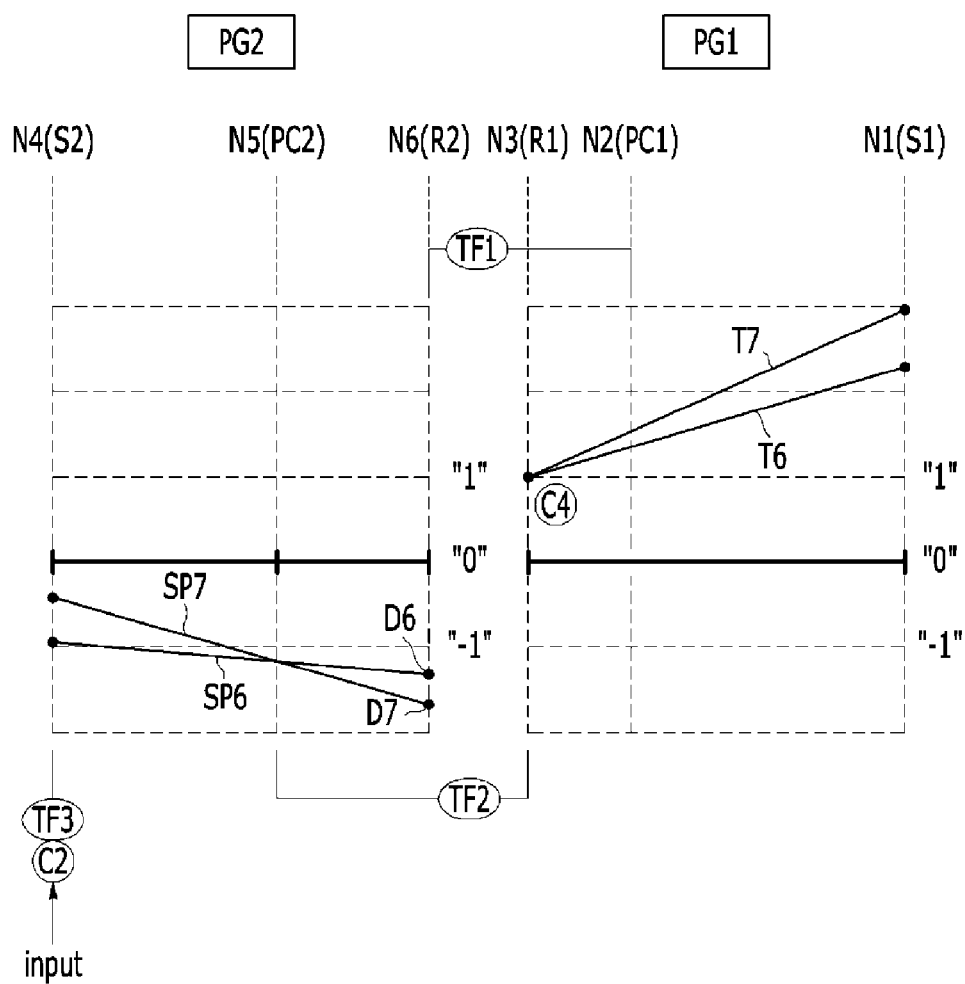
FIG. 3F is a lever diagram of the planetary gear train of FIG. 1 at the seventh forward speed.

As shown in FIG. 3F, the rotation speed of the input shaft IS is input to the third rotation element N3 by operation of the fourth clutch C4. In addition, the rotation speed of the input shaft IS is converted according to the gear ratio of the third transfer gear TF3 and is then input to the fourth rotation element N4 by operation of the second clutch C2.

Therefore, the rotation elements of the first planetary gear set PG1 form a seventh speed line T7 and the rotation elements of the second planetary gear set PG2 form a seventh shift line SP7 by cooperation of the first planetary gear set PG1 and the second planetary gear set PG2. Therefore, D7 is output through the sixth rotation element N6 that is the output element.

Eighth Forward Speed

The second clutch C2 that was operated at the seventh forward speed 7TH is released and the second brake B2 is operated at the eighth forward speed 8TH.

Figure 3G:
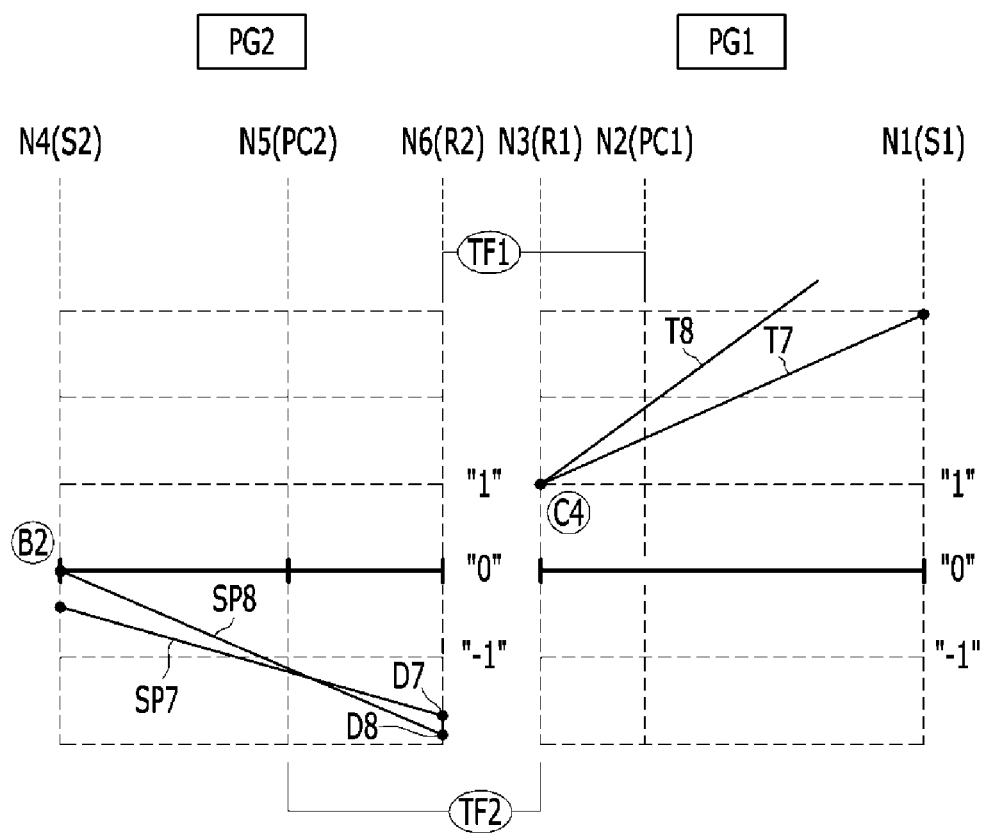
FIG. 3G is a lever diagram of the planetary gear train of FIG. 1 at the eighth forward speed.

As shown in FIG. 3G, the rotation speed of the input shaft IS is input to the third rotation element N3 by operation of the fourth clutch C4 and the fourth rotation element N4 is operated as the fixed element by operation of the second brake B2.

Therefore, the rotation elements of the first planetary gear set PG1 form an eighth speed line T8 and the rotation elements of the second planetary gear set PG2 form an eighth shift line SP8 by cooperation of the first planetary gear set PG1 and the second planetary gear set PG2. Therefore, D8 is output through the sixth rotation element N6 that is the output element.

Reverse Speed

As shown in FIG. 2, the third clutch C3 and the first brake B1 are operated at the reverse speed REV.

Figure 3H:
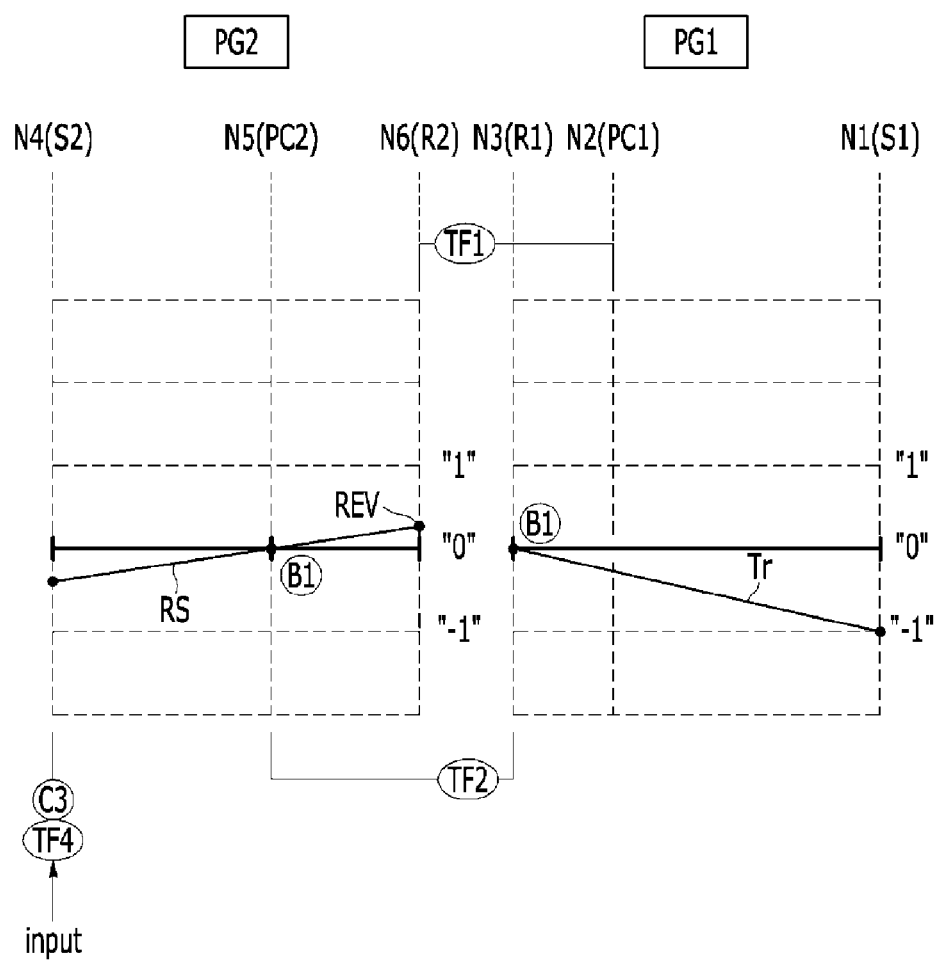
FIG. 3H is a lever diagram of the planetary gear train of FIG. 1 at the reverse speed.

As shown in FIG. 3H, the rotation speed of the input shaft IS is converted according to the gear ratio of the fourth transfer gear TF4 and is then input to the fourth rotation element N4 by operation of the third clutch C3, and the fifth rotation element N5 is operated as the fixed element by operation of the first brake B1.

Therefore, the rotation elements of the first planetary gear set PG1 form a reverse speed line Tr and the rotation elements of the second planetary gear set PG2 form a reverse shift line RS. Therefore, REV is output through the sixth rotation element N6 that is the output element.

As described above, the planetary gear train according to various embodiments of the present invention can achieve eight forward speeds and one reverse speed by combining two planetary gear sets PG1 and PG2 being the simple planetary gear sets, four transfer gears TF1, TF2, TF3, and TF4 being the externally-meshed gears and six frictional elements C1, C2, C3, C4, B1, and B2.

In addition, optimum gear ratios may be set due to ease of changing gear ratios by using four transfer gears being externally-meshed gears as well as the planetary gear sets. Since gear ratios can be changed according to target performance, starting performance, power delivery performance and fuel economy may be improved. Therefore, a start-up clutch instead of a torque converter may be used.

In addition, two friction elements are operated at each shift-speed and one friction element is released and another friction element is operated so as to shift to a neighboring shift-speed. Therefore, shift control condition is fully satisfied.

Figure 4:
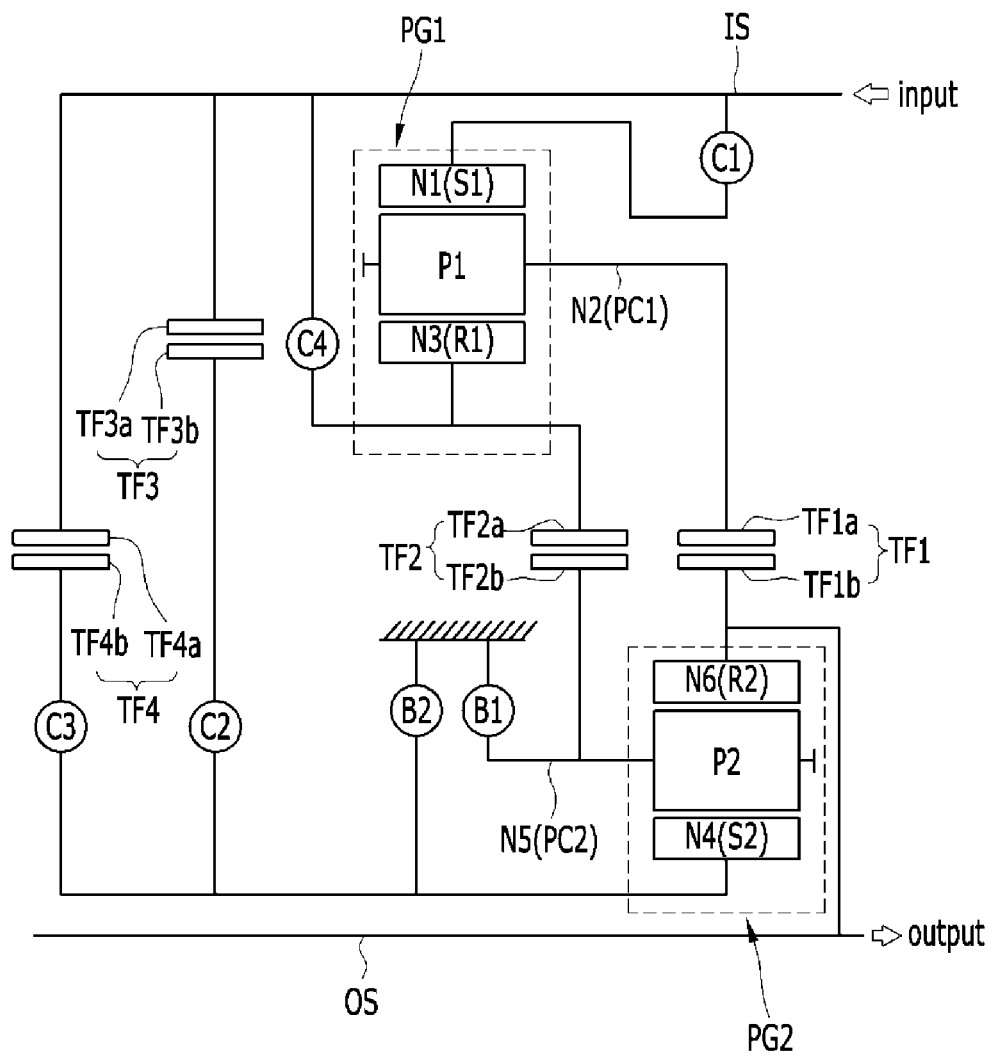
FIG. 4 is a schematic diagram of an exemplary planetary gear train according to the present invention.

FIG. 4 is a schematic diagram of a planetary gear train according to various embodiments of the present invention.

Referring to FIG. 4, the second clutch C2 is disposed between the fourth rotation element N4 and the third transfer gear TF3, in contrast to FIG. 1 which shows the second clutch C2 is disposed between the input shaft IS and the third transfer gear TF3.

Since functions of this illustrated embodiment are similar to those of the above-described embodiments except the position of the second clutch C2, detailed description thereof will be omitted.

Figure 5:
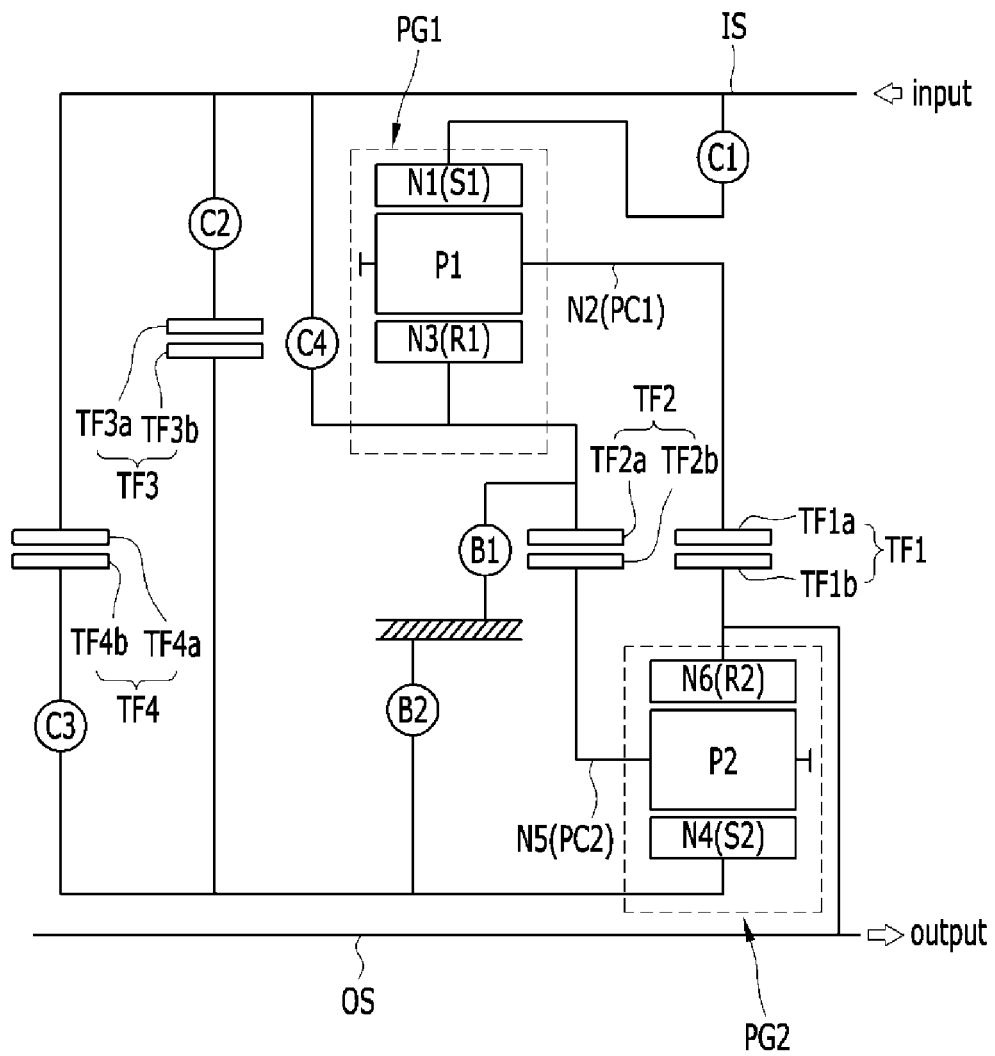
FIG. 5 is a schematic diagram of an exemplary planetary gear train according to the present invention.

FIG. 5 is a schematic diagram of a planetary gear train according to various embodiments of the present invention.

Referring to FIG. 5, the first brake B1 is disposed between the third rotation element N3 and the transmission housing H, in contrast to FIG. 1, which shows the first brake B1 is disposed between the fifth rotation element N5 and the transmission housing H.

Since functions of this illustrated embodiment are similar to those of the above-described embodiments except the position of the first brake B1, detailed description thereof will be omitted.

Figure 6:
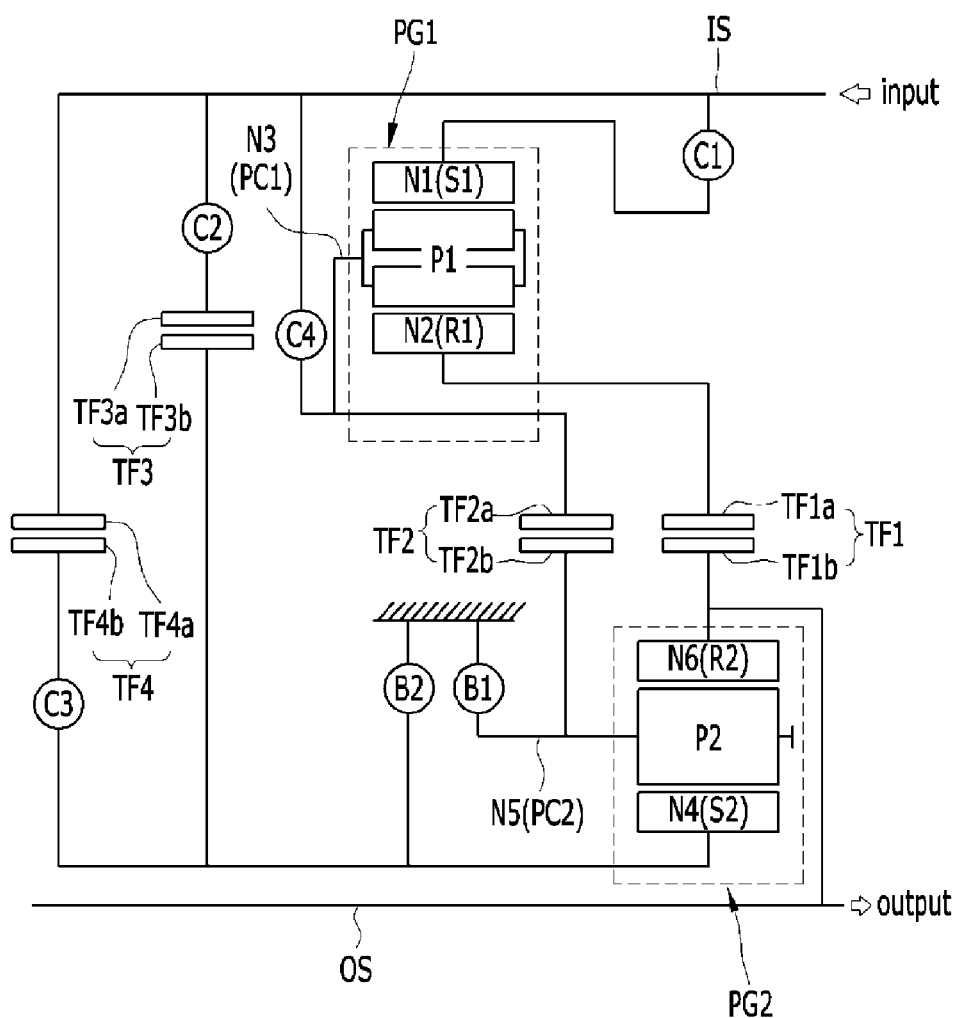
FIG. 6 is a schematic diagram of an exemplary planetary gear train according to the present invention.

FIG. 6 is a schematic diagram of a planetary gear train according to various embodiments of the present invention.

Referring to FIG. 6, the first planetary gear set PG1 is a double pinion planetary gear set, in contrast to FIG. 1, which shows the first planetary gear set PG1 is the single pinion planetary gear set.

Therefore, the second rotation element N2 is changed from the first planet carrier PC1 to the first ring gear R1 and the third rotation element N3 is changed from the first ring gear R1 to the first planet carrier PC1.

Since functions of this illustrated embodiment are similar to those of the above-described embodiments except the rotation elements consisting of the second and third rotation elements N2 and N3, detailed description thereof will be omitted.

Eight forward speeds and one reverse speed can be achieved by combining two planetary gear sets being the simple planetary gear sets, four transfer gears and six frictional elements.

In addition, since two planetary gear sets are disposed separately on the input shaft and the output shaft disposed in parallel with a predetermined distance, a length thereof may be reduced and mountability may be improved.

In addition, optimum gear ratios may be set due to ease of changing gear ratios by using four external-meshing gears as well as the planetary gear sets. Since gear ratios can be changed according to target performance, starting performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving engine torque;
   an output shaft parallel with the input shaft at a predetermined distance and outputting changed torque;
   a first planetary gear set disposed on the input shaft, and including a first rotation element selectively connectable to the input shaft, a second rotation element, and a third rotation element selectively connectable to the input shaft;
   a second planetary gear set disposed on the output shaft, and including a fourth rotation element selectively connectable to the input shaft or selectively connectable to a transmission housing, a fifth rotation element selectively connectable to the input shaft or the transmission housing, and a sixth rotation element connected to the second rotation element and directly connected to the output shaft;
   a first transfer gear including a first transfer drive gear connected to the second rotation element and a first transfer driven gear connected to the sixth rotation element;
   a second transfer gear including a second transfer drive gear connected to the third rotation element and a second transfer driven gear connected to the fifth rotation element;
   a third transfer gear including a third transfer drive gear selectively connectable to the input shaft and a third transfer driven gear connected to the fourth rotation element; and
   a fourth transfer gear including a fourth transfer drive gear connected to the input shaft and a fourth transfer driven gear selectively connectable to the fourth rotation element.

2. The planetary gear train of claim 1, wherein the first planetary gear set is a single pinion planetary gear set having a first sun gear being the first rotation element, a first planet carrier being the second rotation element, and a first ring gear being the third rotation element; and
   the second planetary gear set is a single pinion planetary gear set having a second sun gear being the fourth rotation element, a second planet carrier being the fifth rotation element, and a second ring gear being the sixth rotation element.

3. The planetary gear train of claim 1, wherein the frictional elements comprise:
   a first clutch disposed between the input shaft and the first rotation element;
   a second clutch disposed between the input shaft and the third transfer gear;
   a third clutch disposed between the fourth transfer gear and the fourth rotation element;
   a fourth clutch disposed between the input shaft and the third rotation element;
   a first brake disposed between the fifth rotation element and the transmission housing; and
   a second brake disposed between the fourth rotation element and the transmission housing.

4. The planetary gear train of claim 3, wherein the first clutch and the first brake are operated at a first forward speed; the first clutch and the second brake are operated at a second forward speed;
   the first clutch and the second clutch are operated at a third forward speed;
   the first clutch and the third clutch are operated at a fourth forward speed;
   the first clutch and the fourth clutch are operated at a fifth forward speed;
   the third clutch and the fourth clutch are operated at a sixth forward speed;
   the second clutch and the fourth clutch are operated at a seventh forward speed;
   the fourth clutch and the second brake are operated at an eighth forward speed; and
   the third clutch and the first brake are operated at a reverse speed.

5. A planetary gear train of an automatic transmission for a vehicle, comprising:
   an input shaft receiving engine torque;
   an output shaft parallel with the input shaft with a predetermined distance and outputting changed torque;
   a first planetary gear set disposed on the input shaft, and including a first rotation element selectively connectable to the input shaft, a second rotation element, and a third rotation element selectively connectable to the input shaft;
   a second planetary gear set disposed on the output shaft, and including a fourth rotation element selectively connectable to the input shaft or selectively connectable to a transmission housing, a fifth rotation element selectively connectable to the input shaft or the transmission housing, and a sixth rotation element connected to the second rotation element and directly connected to the output shaft;
   a first clutch selectively connecting the input shaft with the first rotation element;
   a second clutch selectively connecting the input shaft with the fourth rotation element;
   a third clutch selectively connecting the input shaft with the fourth rotation element;
   a fourth clutch selectively connecting the input shaft with the third rotation element;
   a first brake selectively connecting the fifth rotation element with the transmission housing;
   a second brake selectively connecting the fourth rotation element with the transmission housing;
   a first transfer gear connecting the second rotation element with the sixth rotation element;
   a second transfer gear connecting the third rotation element with the fifth rotation element;
   a third transfer gear connecting the second clutch with the fourth rotation element; and
   a fourth transfer gear connecting the input shaft with the third clutch.

6. The planetary gear train of claim 5, wherein the first planetary gear set is a single pinion planetary gear set having a first sun gear being the first rotation element, a first planet carrier being the second rotation element, and a first ring gear being the third rotation element; and
   the second planetary gear set is a single pinion planetary gear set having a second sun gear being the fourth rotation element, a second planet carrier being the fifth rotation element, and a second ring gear being the sixth rotation element.

* * * * *